(12) United States Patent
Hou et al.

(10) Patent No.: US 8,471,948 B2
(45) Date of Patent: Jun. 25, 2013

(54) CAMERA MODULE FACILITATING HEAT DISSIPATION

(75) Inventors: Sheng-Hung Hou, Tu-Cheng (TW); Wen-Ching Lai, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 261 days.

(21) Appl. No.: 13/113,943

(22) Filed: May 23, 2011

(65) Prior Publication Data
US 2012/0212664 A1 Aug. 23, 2012

(30) Foreign Application Priority Data
Feb. 21, 2011 (TW) .............................. 100105559 A

(51) Int. Cl.
 *H04N 5/225* (2006.01)
(52) U.S. Cl.
 USPC .......................................... 348/340; 348/374
(58) Field of Classification Search
 USPC ... 348/340, 373, 374; 359/819, 820; 257/276, 257/E31.131
 See application file for complete search history.

(56) References Cited

U.S. PATENT DOCUMENTS

| 4,897,508 | A | * | 1/1990 | Mahulikar et al. | 174/522 |
| 7,554,599 | B2 | * | 6/2009 | Tu et al. | 348/340 |
| 2004/0017501 | A1 | * | 1/2004 | Asaga et al. | 348/340 |
| 2004/0169771 | A1 | * | 9/2004 | Washington et al. | 348/374 |
| 2004/0239794 | A1 | * | 12/2004 | Saito et al. | 348/340 |
| 2011/0005030 | A1 | * | 1/2011 | Shirono | 15/363 |

* cited by examiner

*Primary Examiner* — Nelson D. Hernández Hernández
(74) *Attorney, Agent, or Firm* — Altis Law Group, Inc.

(57) ABSTRACT

A camera module includes a printed circuit board (PCB), an image sensor fixed to the PCB, a lens holder fixed to the PCB and covering the image sensor, a lens barrel coupled to the lens holder, and a lens received in the lens barrel. The lens holder includes an inner sensor cover and an outer sensor cover surrounding the inner sensor cover. The image sensor, the inner sensor cover, the lens barrel and the lens define an enclosed space. The inner sensor cover and the outer sensor cover define an intermediate space. The inner sensor cover defines an inner dissipation hole communicating the enclosed space with the intermediate space. The outer sensor cover defines an outer dissipation hole that communicates the intermediate space with the outside of the outer sensor cover. The inner dissipation hole and the outer dissipation hole are misaligned to prevent the ingress of light and dust.

6 Claims, 4 Drawing Sheets ical Field
The present disclosure relates to camera modules and, particularly, to a camera module capable of efficiently dissipating heat.

2. Description of Related Art

Camera modules often include a printed circuit board (PCB), a lens holder disposed on the PCB, an image sensor disposed on the PCB and received in the lens holder, a lens barrel held by the lens holder, and a lens received in the lens barrel. The PCB, the lens holder, the lens barrel, and the lens cooperatively form an enclosed space, in which the image sensor is received. In operation, the image sensor generates heat, which cannot be efficiently dissipated. As a result, increased air pressure in the enclosed space may cause the PCB to deform, which in turn may cause the lens holder and the image sensor to be displaced, decreasing image quality of the camera module.

Therefore, it is desirable to provide a camera module, which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
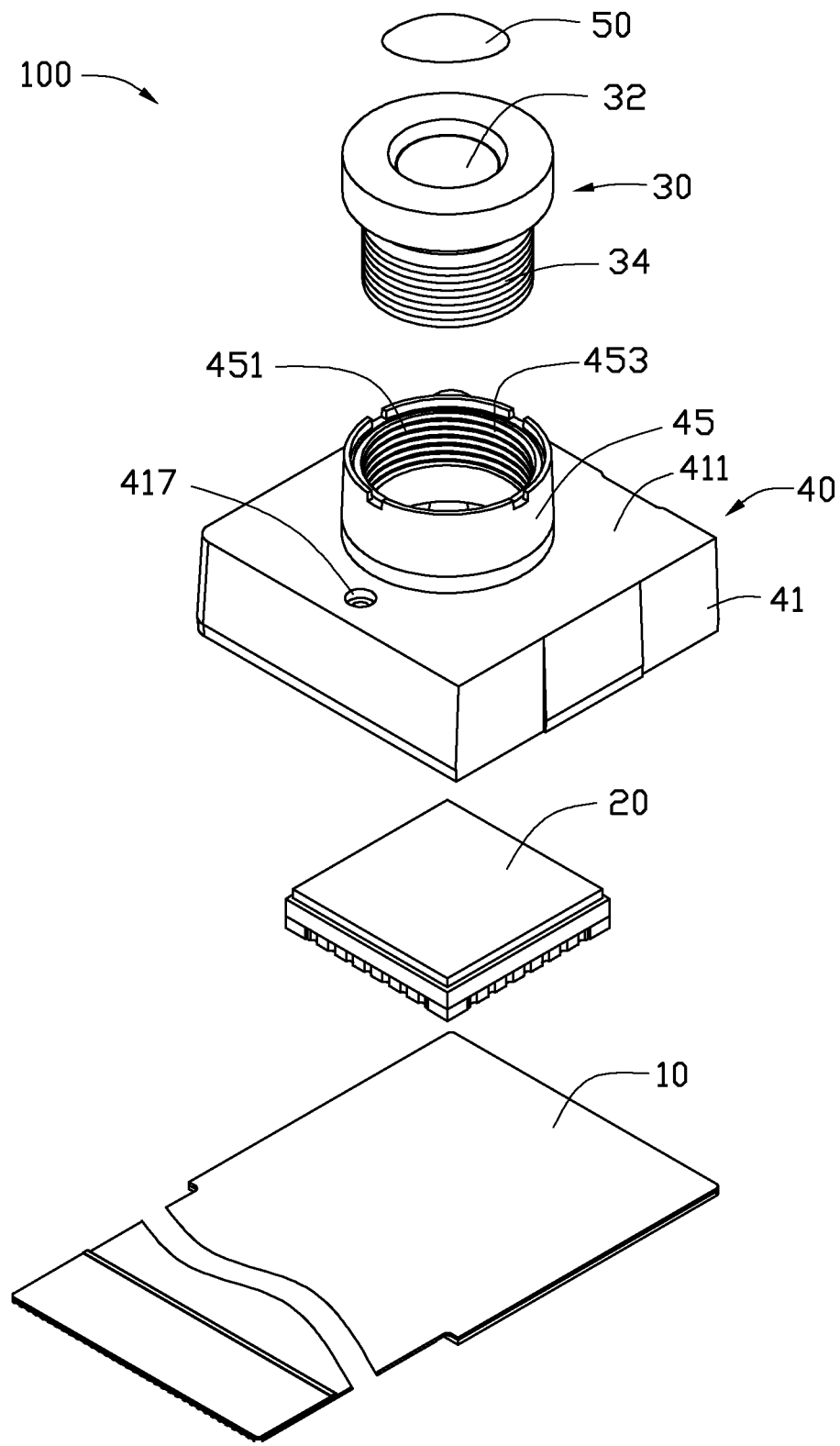
FIG. 1 is an isometric, exploded, and schematic view of a camera module, according to an embodiment.

Referring to FIG. 1, a camera module 100, according to an embodiment, includes a printed circuit board (PCB) 10, an image sensor 20, a lens barrel 30, a lens holder 40, and a lens 50.

The PCB 10 is a flexible PCB (FPCB) in this embodiment and thus is readily deformed.

The image sensor 20, such as a couple charge-coupled device (CCD) sensor or a complementary metal oxide semiconductor (CMOS) sensor, is configured for capturing images.

The lens barrel 30 is a tube which defines a barrel through hole 32 therethrough and an external threaded section 34 in the outer surface of the lens barrel 30, generally at the image-side end of the lens barrel 30.

Figure 2:
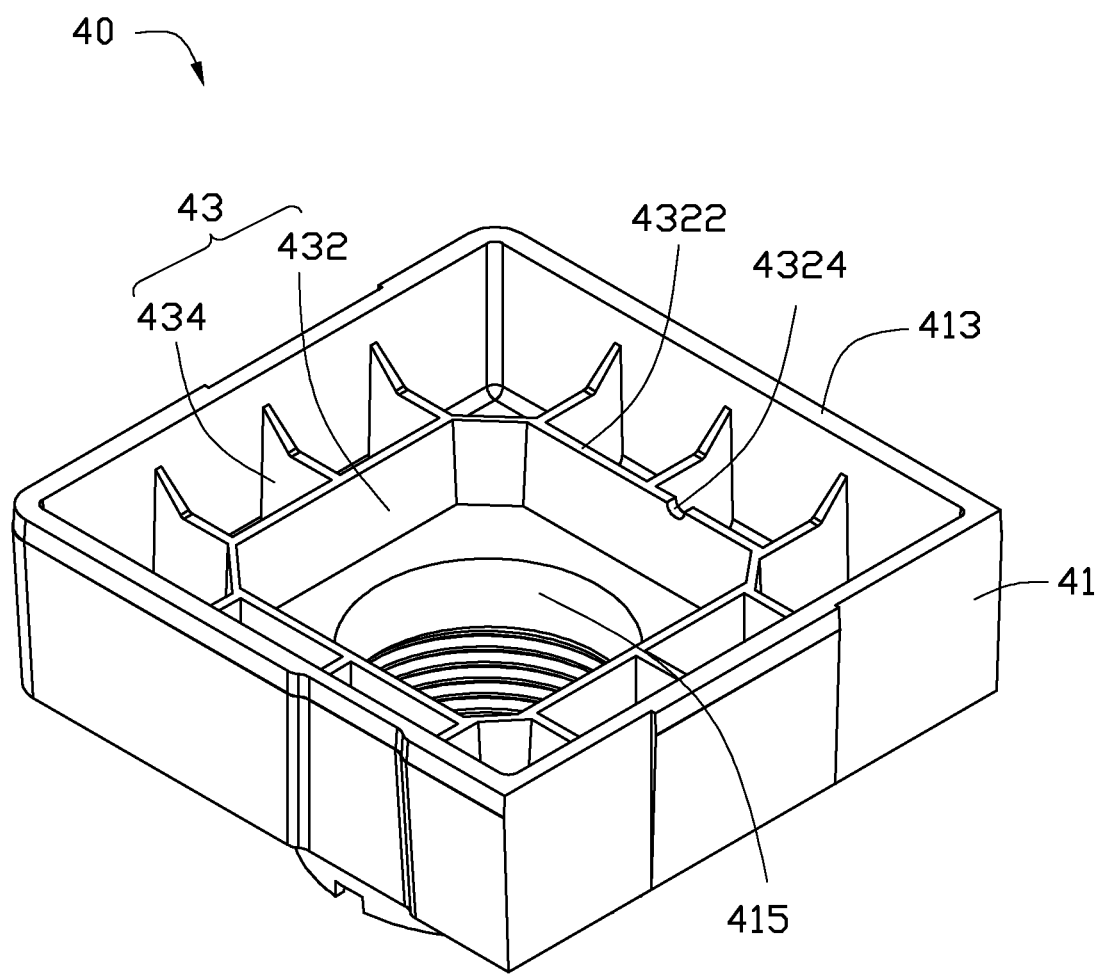
FIG. 2 is an isometric and schematic view of a lens holder of the camera module of FIG. 1.

Also referring to FIG. 2, the lens holder 40 includes an outer sensor cover 41, an inner sensor cover 43, and a barrel coupler 45.

The outer sensor cover 41 is cuboid with the bottom side open, and includes an upper surface 411 and a lower surface 413. The outer sensor cover 41 defines a cover through hole 415 generally through the center of the upper surface 411 and an outer dissipation hole 417 in the upper surface 411. The outer dissipation hole 417 forms an upper section 4171 contiguous with the upper surface 411 and a lower section 4173 below the upper surface 411 (see FIG. 4). The diameter of the upper section 4171 is larger than that of the lower section 4173.

The inner sensor cover 43 is received in the outer sensor cover 41. In particular, the inner sensor cover 43 includes a sidewall 432 which is a substantially a rectangular tube in shape and extends uprightly from a surface of the outer sensor cover 41 opposite to the upper surface 411 and corresponds to the image sensor 20, that is, the bottom opening of the sidewall 432 corresponds to the periphery of the image sensor 20 in shape and size. The sidewall 432 surrounds the cover through hole 415 and includes an end surface 4322 opposite to the upper surface 411. The sidewall 432 also defines an inner dissipation hole 4324 therethrough. In this embodiment, the inner dissipation hole 4324 is a semicircular hole indented into the end surface 4322. The outer sensor cover 43 also includes a number of reinforcing ribs 434 extending upward from the surface of the outer sensor cover 41 opposite to the upper surface 411. The reinforcing ribs 434 are arranged around the sidewall 432 and connect the sidewall 432 to the outer sensor cover 41.

The barrel coupler 45 is tubular, extending upward from the upper surface 411 and aligning with the periphery of the cover through hole 415. The barrel coupler 45 defines a coupler through hole 451 therethrough, communicating with the cover through hole 415. The barrel coupler 45 forms an internal threaded section 453 in the inner surface of the barrel coupler 45, generally at the object-side end of the barrel coupler 45 and corresponding the external threaded section 34.

The lens 50 is configured is for optical imaging.

Figure 3:
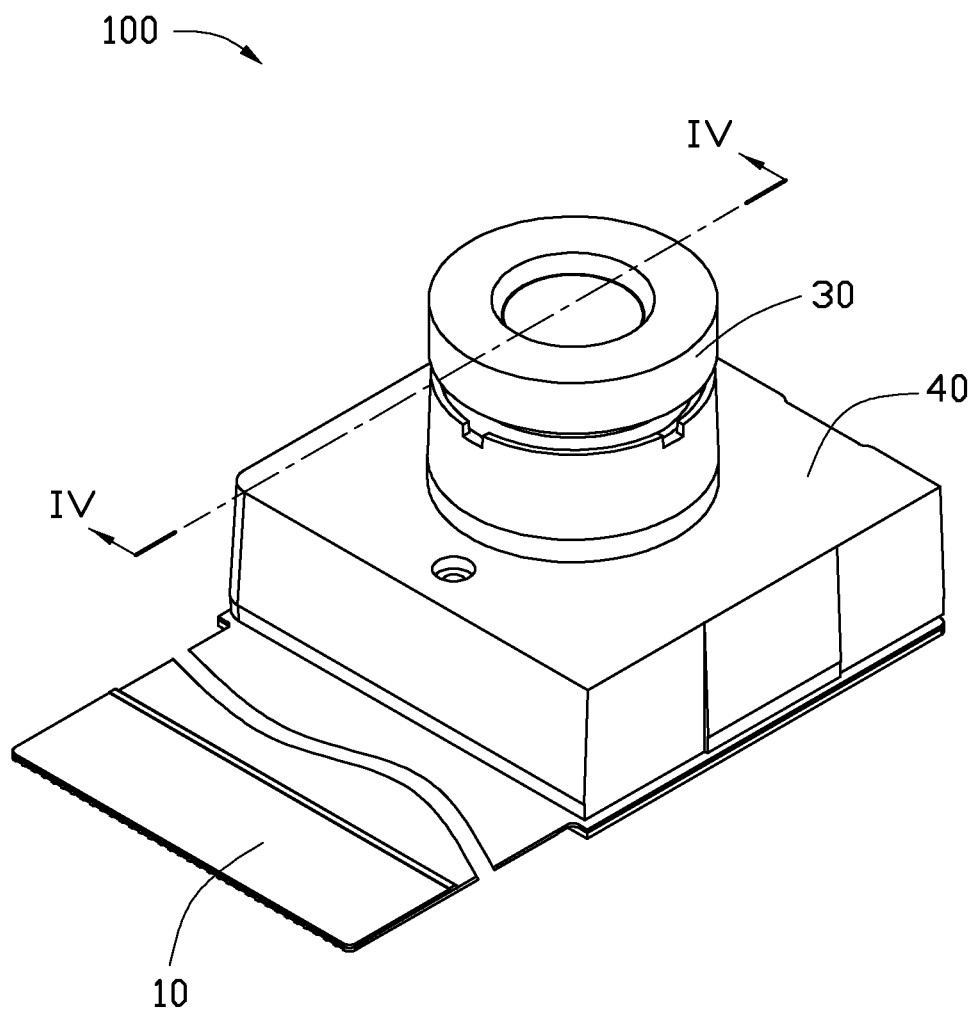
FIG. 3 is an isometric, assembled, and schematic view of the camera module of FIG. 1.
Figure 4:
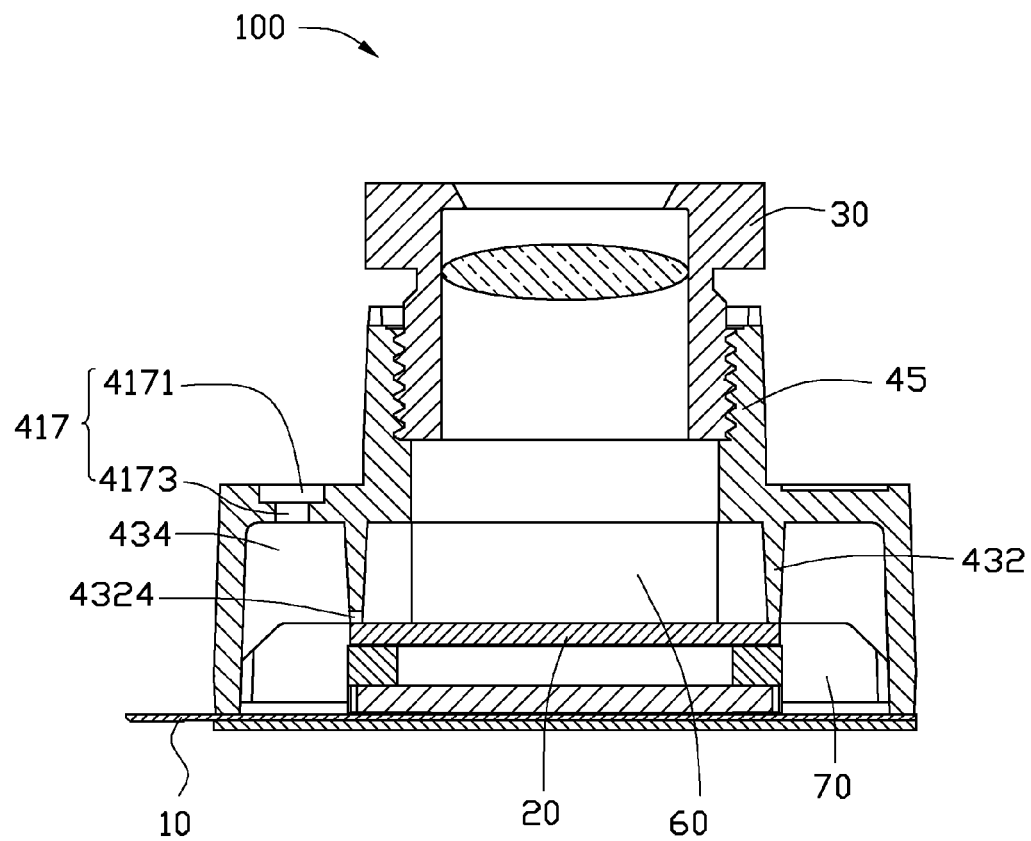
FIG. 4 is a cross-sectional schematic view of the camera module, taken alone a line IV-IV of FIG. 3.

Referring to FIGS. 3 and 4, in assembly, the lens 50 is received in the lens barrel 30, sealing the barrel through hole 32. The lens barrel 30 is inserted into the coupler through hole 451 and threadedly coupled to the lens holder 40 by the engagement of the outer threaded section 34 with the internal threaded section 453. Thus, a light-transmitting channel is formed by the barrel through hole 32, the coupler through hole 451, and the cover through hole 415. The image sensor 20 is fixed and electrically connected to the PCB 10. The lens holder 40 is fixed to the PCB 10 in such a way that light rays travelling through the light-transmitting channel impinge on the light sensor 20. The lower surface 413 contacts the PCB 10 in such a way as to ensure that the lens holder 40 stands out vertically from the PCB 10. The sidewall 432 aligns with the image sensor 20 and the end surface 4322 contacts the periphery of the image sensor 20. Thus, the image sensor 20, the inner sensor cover 43, the lens barrel 30, and the lens 50 cooperatively define an enclosed space 60. The inner sensor cover 43, the outer sensor cover 41, and the PCB 100 cooperatively define an intermediate space 70. The inner dissipation hole 4324 allows access between the enclosed space 60 and the intermediate space 70, while the outer dissipation hole 417 connects the intermediate space 70 with the outside. A non-linear channel connecting the enclosed space 60 with the outside is formed by the inner dissipation hole 4324, the intermediate space 70, and the outer dissipation hole 417, that is to say the inner dissipation hole 4324 and the outer dissipation hole 417 are not aligned with each other. Thus, heat generated by the image sensor 20 will be dissipated away from the enclosed space 60 to outside via the non-linear channel while the ingress of dust and light will be rejected by the non-linearity of the channel. Thus, air pressure inside the enclosed space 60 will not build up and cause deformation of the PCB 10.

The camera module 100 may include more than one lens 50 that can be received in the lens barrel. In such embodiments, the enclosed space 60 will be bounded by the lens which is closest to the image-side end of the lens barrel 30.

The configuration, in respect of the number, the position, and the shape, of the inner dissipation hole 4324 and outer dissipation hole 417 should not be limited to this embodiment, but can allow other configurations to form other non-linear channel configurations that facilitate heat dissipation while rejecting dust and light. For example, the more than one inner dissipation hole 4324 and outer dissipation hole 417 can be formed in other embodiments. The inner dissipation hole 4324 can be defined in other positions of the sidewall 432. The outer dissipation hole 417 can be formed in other suitable positions in the outer sensor cover 41. The shape of the outer dissipation hole 417 is beneficial for rejecting dust. However, in other embodiments, the outer-dissipation hole 417 can be a one-section hole.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A camera module, comprising:
 a printed circuit board (PCB);
 an image sensor positioned on the PCB;
 a lens holder positioned on the PCB and covering the image sensor;
 a lens barrel coupled to the lens holder; and
 a lens received in the lens barrel;
 wherein the lens holder comprises an inner sensor cover and an outer sensor cover surrounding the inner sensor cover, the inner sensor cover contacts the image sensor, the inner sensor cover, the lens barrel, the image sensor and the lens cooperatively define an enclosed space, the inner sensor cover and the outer sensor cover define an intermediate space, the inner sensor cover defines an inner dissipation hole that communicates the enclosed space with the intermediate space, the outer sensor cover defines an outer dissipation hole that communicates the intermediate space with the outside of the outer sensor cover, and the inner dissipation hole and the outer dissipation are misaligned with each other.

2. The camera module of claim 1, wherein the outer sensor cover comprises an upper surface, the inner sensor cover comprises a sidewall that uprightly extends from a surface of the outer sensor cover opposite to the upper surface, the outer dissipation hole is defined in the upper surface, and the inner dissipation hole is defined in the sidewall.

3. The camera module of claim 1, wherein the outer sensor cover comprises an upper surface and defines a cover through hole in the upper surface, the lens holder comprises a tubular barrel coupler extending upward from the upper surface and aligns with a periphery of the cover through hole, and the lens barrel is coupled to the barrel coupler.

4. The camera module of claim 3, wherein the outer dissipation hole is defined in the upper surface and comprises an upper section and a lower section, and the diameter of the upper section is larger than that of the lower section.

5. The camera module of claim 1, wherein the inner sensor cover comprises a sidewall, the sidewall extends from the outer sensor cover and contacts the periphery of the image sensor.

6. The camera module of claim 5, wherein the inner sensor cover further comprises a plurality of reinforcing ribs, and the ribs are arranged around the sidewall and connect the sidewall to the outer sensor cover.

* * * * *